United States Patent [19]
Hluchyj et al.

[11] Patent Number: 5,450,410
[45] Date of Patent: Sep. 12, 1995

[54] METHOD AND APPARATUS FOR CONSTANT BIT RATE TRAFFIC IN FAST PACKET NETWORKS

[75] Inventors: Michael G. Hluchyj, Wellesley; Amit Bhargava, Watertown, both of Mass.

[73] Assignee: Motorola, Inc., Schaumburg, Ill.

[21] Appl. No.: 123,616

[22] Filed: Sep. 17, 1993

[51] Int. Cl.⁶ .................................. H04L 12/56
[52] U.S. Cl. ...................... 370/94.1; 370/108
[58] Field of Search ............... 370/60, 60.1, 94.1, 370/94.2, 82, 81, 80, 70, 61, 79, 108

[56] References Cited

U.S. PATENT DOCUMENTS

| | | | |
|---|---|---|---|
| 4,630,262 | 12/1986 | Callens et al. | 370/94.1 |
| 4,970,720 | 11/1990 | Esaki | 370/94.1 |
| 5,311,502 | 5/1994 | Mueller et al. | 370/94.1 |

OTHER PUBLICATIONS

M. DePrycker, M. Ryckebusch & P. Barri, "Terminal Synchronization in Asynchronous Networks," IEEE Int, Conf. on Commun., Seattle, Wash., Jun. 1987, pp. 800–807.

P. M. Gopal, J. W. Wong & J. C. Majithia, "Analysis of Playout Strategies for Voice Transmission using Packet Switching Techniques," Performance Evaluation, No. 4, 1984, pp. 11–18.

W. Montgomery, "Techniques for Packet Voice Synchronization," IEEE Journal on Selected Areas in Communications, vol. SAC-1, No. 6, 1983, pp. 1022–1028.

R. P. Singh & S. Singhal, "Voice Transmission over Mixed Packet and Circuit-Switched Networks," Proc. IEEE Infocom '88, New Orleans, La., Apr. 1988, pp. 126–134.

Primary Examiner—Wellington Chin
Attorney, Agent, or Firm—J. Ray Wood

[57] ABSTRACT

A communication network transports packetized constant bit rate data from a source to a receiver. To improve the transport of the data across the network, a method is used to enqueue the packets in a buffer prior to playing out the constant bit rate data to the receiver.

9 Claims, 4 Drawing Sheets

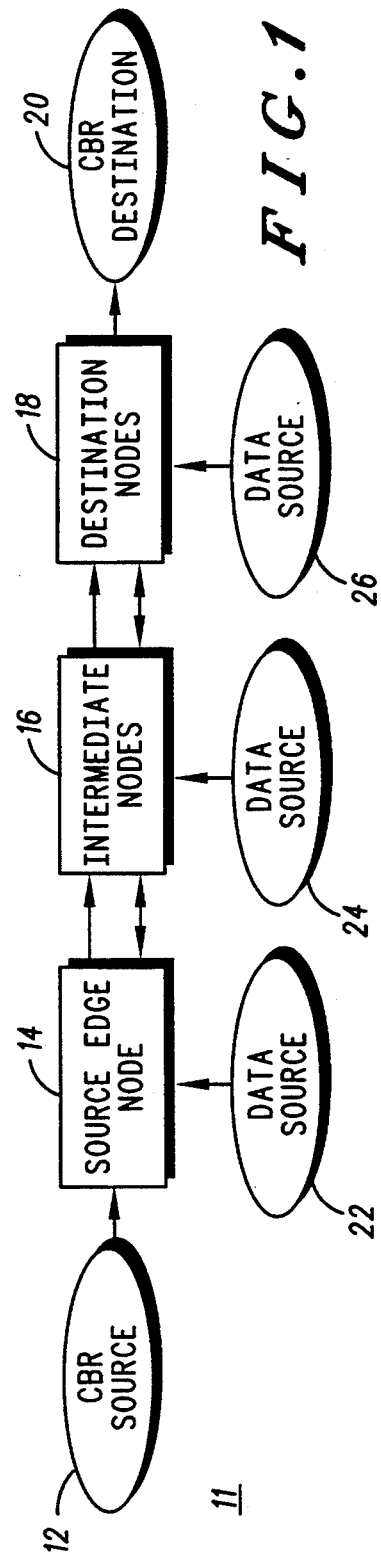
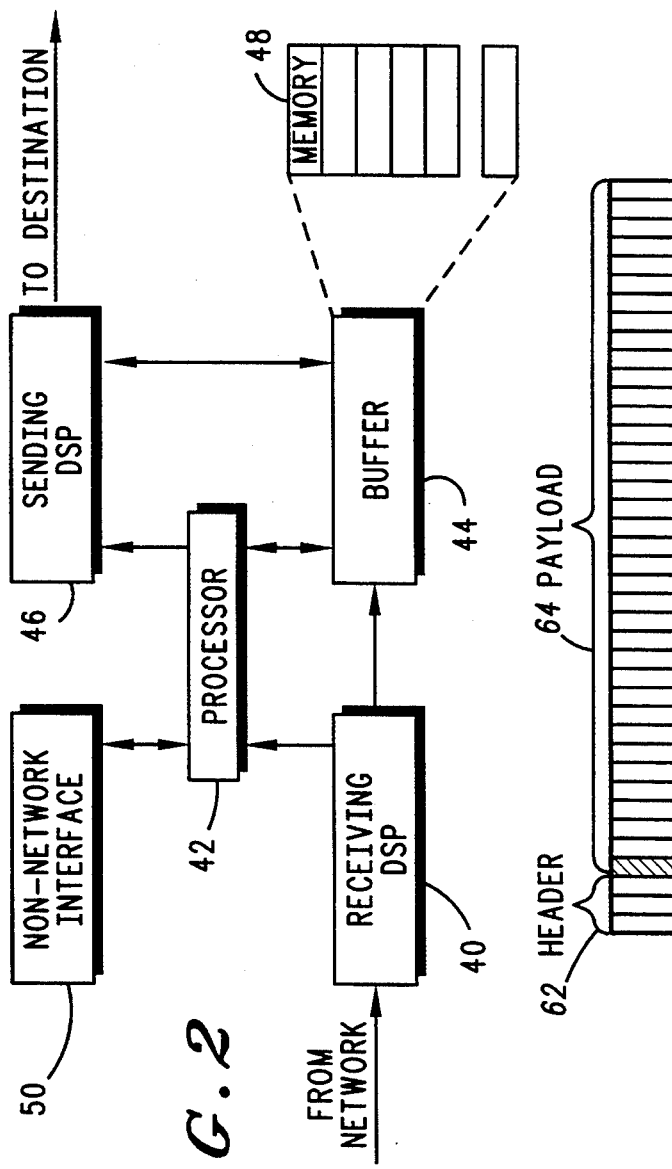

METHOD AND APPARATUS FOR CONSTANT BIT RATE TRAFFIC IN FAST PACKET NETWORKS

FIELD OF THE INVENTION

This invention is generally directed to transmission of constant bit rate traffic in a communication network, and, more specifically, directed to the enqueuing and playout of packets of constant bit rate traffic.

BACKGROUND OF THE INVENTION

Networks consist of a plurality of interrelated nodes. Packet switched networks integrate frame-delimited data traffic, packetized speech and constant bit rate (non-delimited) traffic onto common transmission facilities. The basic unit of transmission in such a network is a "fast packet", also referred to as a "cell". These fast packets are transmitted from node to node within the network to the packets' destination.

When data enters the network through a node, the data is segmented into "fast packets". A fast packet contains a header and a payload. The header usually includes connection identification and other overhead information. The payload contains the data. The size of fast packets is defined by the network. Thus, the header and the payload of the fast packets are also defined by the network. A number of fast packets are usually required to transmit the data through the network.

After the data is packetized, the packets are enqueued at the node with fast packets from other data sources and then transmitted through the network via inter-nodal link transmission facilities. The fast packets are received at another node, and, if the node is not the ultimate destination of the fast packets, then enqueued again with fast packets from other data sources.

Eventually, the fast packets are received at their ultimate destination. The packets are then depacketized and "played back" to the end user (which could be, for example, a data terminal, storage device or audio device).

Fast packets do not move within the network at a constant rate. Fast packets may be delayed due to the various enqueuing procedures at the network nodes. For example, the number of other fast packets received and transmitted at each node impacts the time for transmitting the packets through the network. As failure of nodes or links in the network occur, the route of the fast packets from the inception node to the reception node may change. Packets may even be lost in the network.

Constant bit rate (CBR) data (commonly generated in synchronous communication) presents a special problem. Constant bit rate data is information generated at uniform periods. In order for the CBR data to be accurately processed, the data should be received at its destination at the same constant rate.

Because fast packets do not move within the network at a constant rate, the fast packets are not regularly received at the destination node. Further, the delay in the network may change over time. Provision must be made at the playback of the CBR fast packets to compensate for any irregularity.

One method is to delay the start of playback of the first CBR fast packet for a fixed time period. This may result in a number of CBR fast packets collecting prior to starting playback of the first CBR fast packet. The time delay does somewhat smooth the variable network delays playback of the CBR packets. However, such a method is inflexible and does not adapt to changes in the network. Further, there is no provision for handling of lost packets.

Another method is to "time stamp" each packet by including information in the payload of the packet as to when the packet was created. However, this method requires synchronized clocks at the network nodes. This may not be feasible in all networks, especially geographically large networks.

BRIEF DESCRIPTION OF THE DRAWINGS

FIG. 1 is a general network.
FIG. 2 is a node.
FIG. 3 is a CBR fast packet.

DETAILED DESCRIPTION OF THE DRAWINGS

Figure 4:
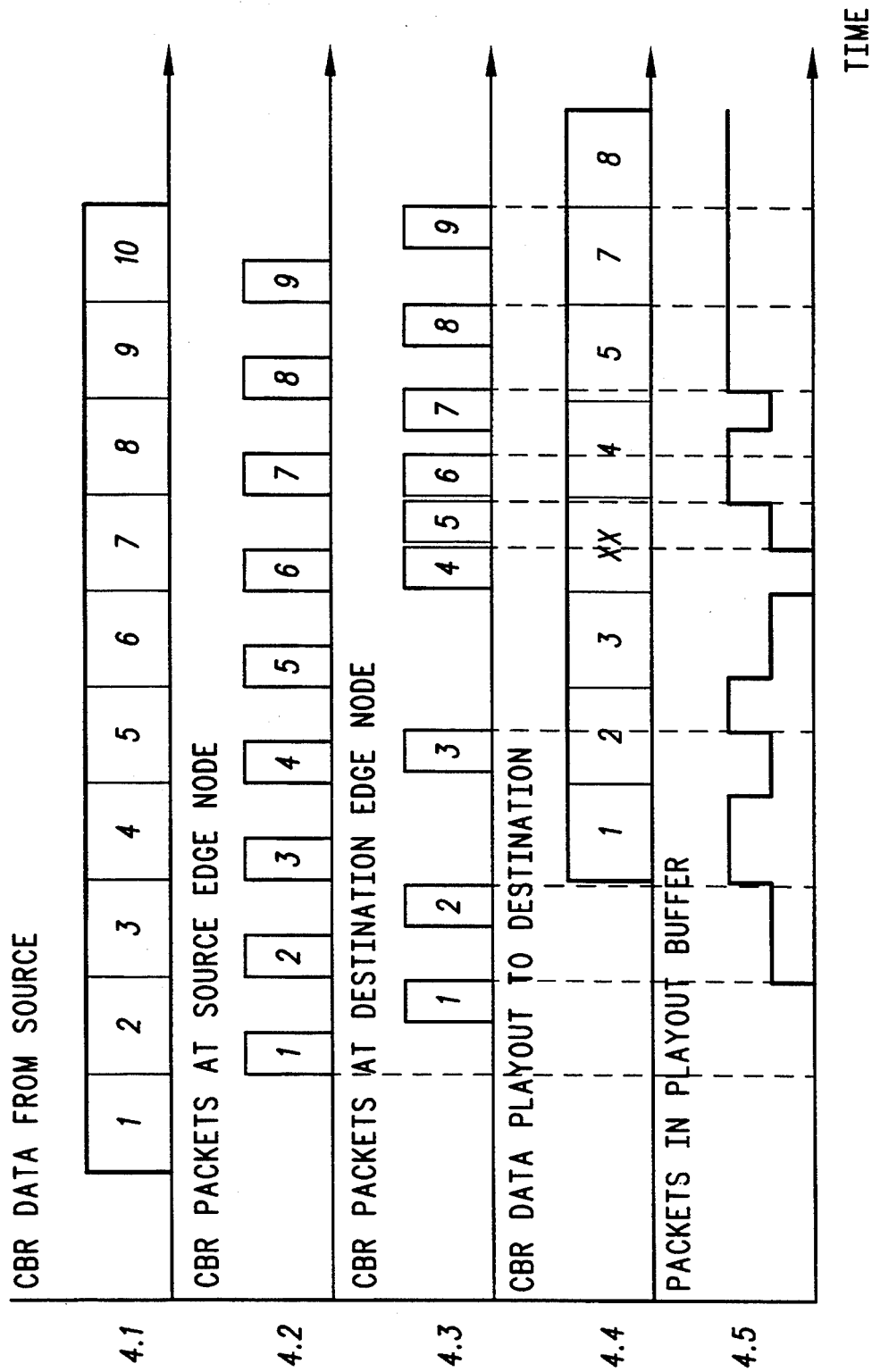
FIG. 4 is a timing diagram showing CBR traffic as it progresses through the network.

Network 11, shown in FIG. 1, is a generalized representation of data networks. Networks in use may be more complicated than that shown in FIG. 1. Network 11 consists of source node 14, intermediate nodes 16 and destination edge node 18. Generally, data networks consist of many source nodes, intermediate nodes and destination nodes.

A node is shown in FIG. 2. The general depiction of a node shown in FIG. 2 could be source edge node 14, intermediate node 16 or destination edge node 18. Receiving digital signal processor (DSP) 40 receives data in the form of fast packets from network 11. Processor 42 directs data received by receiving DSP 40 to buffer 44 or sending DSP 46.

Buffer 44 consists of memory 48. Data directed to buffer 44 by processor 42 is stored in memory 48. Processor 42 may direct data stored in buffer 44 to sending DSP 46 or may utilize the data for other purposes.

Processor 42 also receives data from data sources 50. Data sources 50 could be terminals, modems, or DSPs external to network 11. When data from sources external to the network is received, processor 42 must first "packetize" the data into fast packets for transmission within network 11.

FIG. 3 shows fast packet 60. Fast packet 60 includes a series of bytes. Fast packet 60 includes a header 62 and a payload 64. Header 62, shown with three bytes, contains information used by nodes 14, 16, 18 to relay fast packet 60 to its destination. Payload 64, here shown with 45 bytes, contains data and information related to the data. Part of payload 64 is sequence number 66.

Sequence number 66 is assigned by the source edge node 14. Each successive CBR packet is assigned a successive sequence number 66 using a modulus counting process.

Packetization of data by the processor 42 consists of accumulating bytes of information from the data source 50. After a sufficient number of bytes have been accumulated, the bytes are placed into payload 64 along with sequence number 66. Payload 64 may also contain other information besides sequence number 64 and data, such as information to convey network independent timing from the CBR source 12 clock rate at the source edge node 14 to destination edge node 18 where it is used to clock the CBR data to CBR destination 20.

Header 62, containing a connection identifier for fast packet 60, is attached to payload 64 for use in relaying fast packet 60 to its destination within network 11.

Referring once again to FIG. 1, the source edge node 14 is shown coupled to the CBR source 12. CBR source 12 may be a synchronous data terminal or any other device that generates CBR data. Since CBR source 12 generates a constant stream of data, CBR packets are created at regular intervals.

Source edge node 14 enqueues in buffer 44 the CBR packets with packets from data source 20 for transmission in network 11. The CBR packets are transmitted via sending DSP 46 to intermediate node 16. While one intermediate node 16 is shown, it is understood that more (or no) intermediate nodes may be present in a network.

At intermediate nodes 16, the CBR packets are again enqueued for transmission in network 11. Additional data is received from data source 24, and is packetized and queued for transmission in network 11. The CBR packets are transmitted to destination edge node 18.

At destination edge node 18, the CBR packets are received for playout to CBR destination 20. As with nodes 14 and 16, destination edge node 18 also receives data from data source 26.

With reference to FIG. 2, portion of buffer 44 is set aside as a CBR packet buffer. Playout is accomplished by placing the packets in the CBR buffer (enqueuing) and, at a later time, retrieving the packets from the CBR buffer (dequeuing) and transmitting the packets as CBR data to the destination ("playing out").

FIG. 4 illustrates the timing of the CBR packets throughout the network. FIG. 4.1 shows the CBR data as it is received by source edge node 14. The CBR data is received as a continuous stream of data from CBR source 12. FIG. 4.2 shows the CBR data after packetization by source edge node 14. Sequence number 66 appears on each CBR packet. Since the CBR data is received continuously, the CBR packets are created regularly.

FIG. 4.3 shows the receipt by destination edge node 18 of the CBR packets. Due to various delays within network 11, the CBR packets are received irregularly by destination edge node 18. The CBR packets must be played out to CBR destination 20 in a manner that maintains the integrity of the CBR data.

Figure 5:
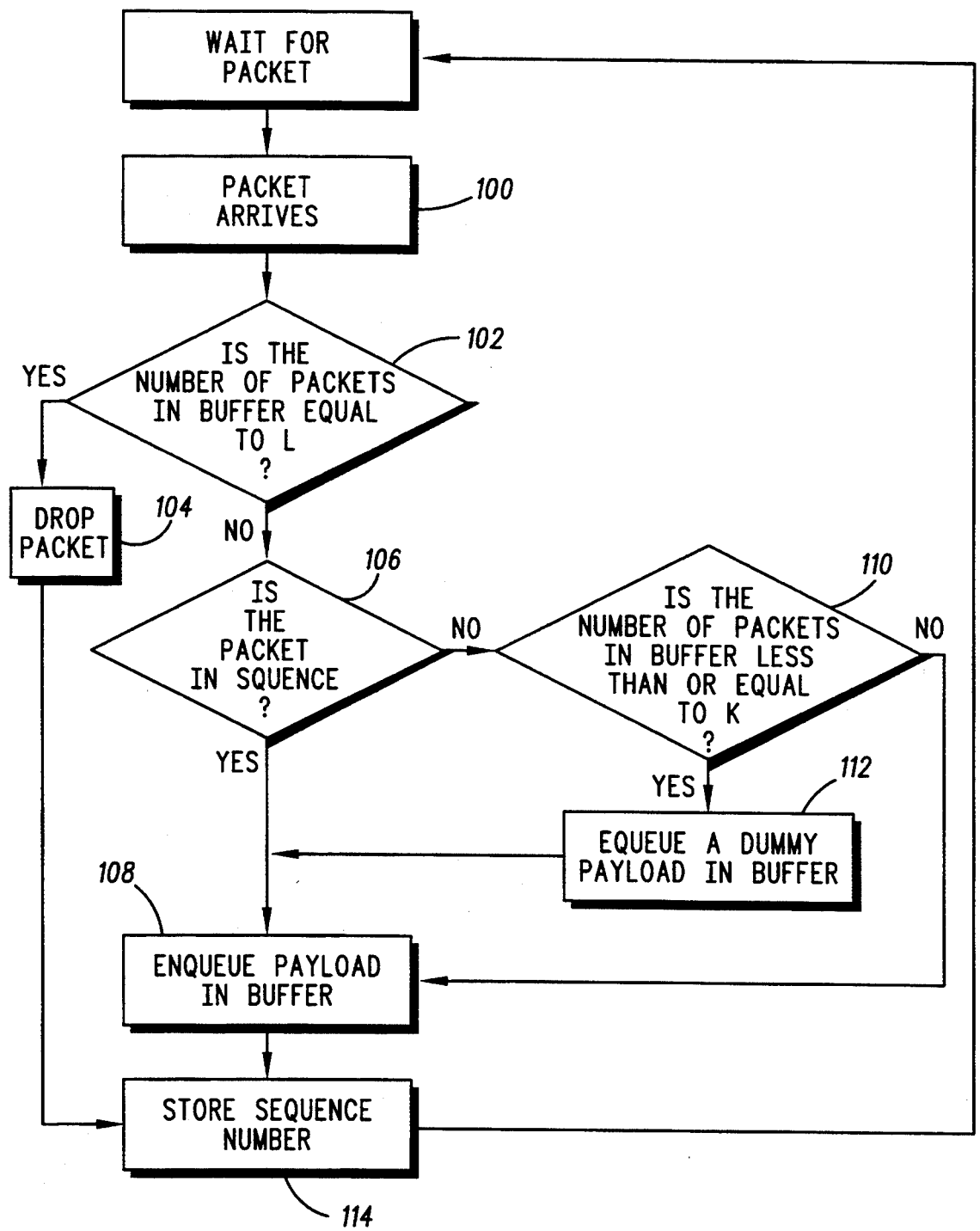
FIG. 5 is a chart of the enqueuing process for CBR fast packets at the CBR traffic destination node.

FIG. 5 shows the enqueuing of the CBR packets at destination edge node 18.

Destination edge node 18 waits for arrival of the CBR packets (step 100). Upon receipt of a packet, the processor determines if the number of packets in the buffer is equal to the size of the playout buffer (represented by variable 'L') (step 102). If the number of packets in the buffer is equal to L, then the packet is not enqueued, and is, consequently, dropped (step 104). If the number of packets in the buffer is less than L, the packet sequence number is checked to determine if the packet is in sequence (step 106). A CBR packet is "in sequence" if the CBR packet is either the first CBR packet received or is the next CBR packet expected by destination edge node 18.

If the CBR packet is in sequence, then the payload from the packet is enqueued in the buffer for playout to CBR destination 20 (step 108).

On the other hand, if the CBR packet is not in sequence (i.e., the packet is "out of sequence"), the number of packets on the buffer is compared with 'K' (step 110). K is a preselected number, indicating quantitatively, if the system will correct the playout for an out of sequence packet. If the number of packets in the buffer is less than K, then a "dummy packet", containing a fixed, but arbitrary sequence of bit values, is enqueued in an attempt to correct the sequence (step 112), after which the CBR packet is enqueued (step 108). If the number of packets is greater than K, then the out of sequence CBR packet is enqueued (step 108).

In all events, the sequence number of the received packet is stored for comparison with the next CBR packet (step 114). CBR destination edge node 18 waits for receipt of the next CBR packet (step 100).

Figure 6:
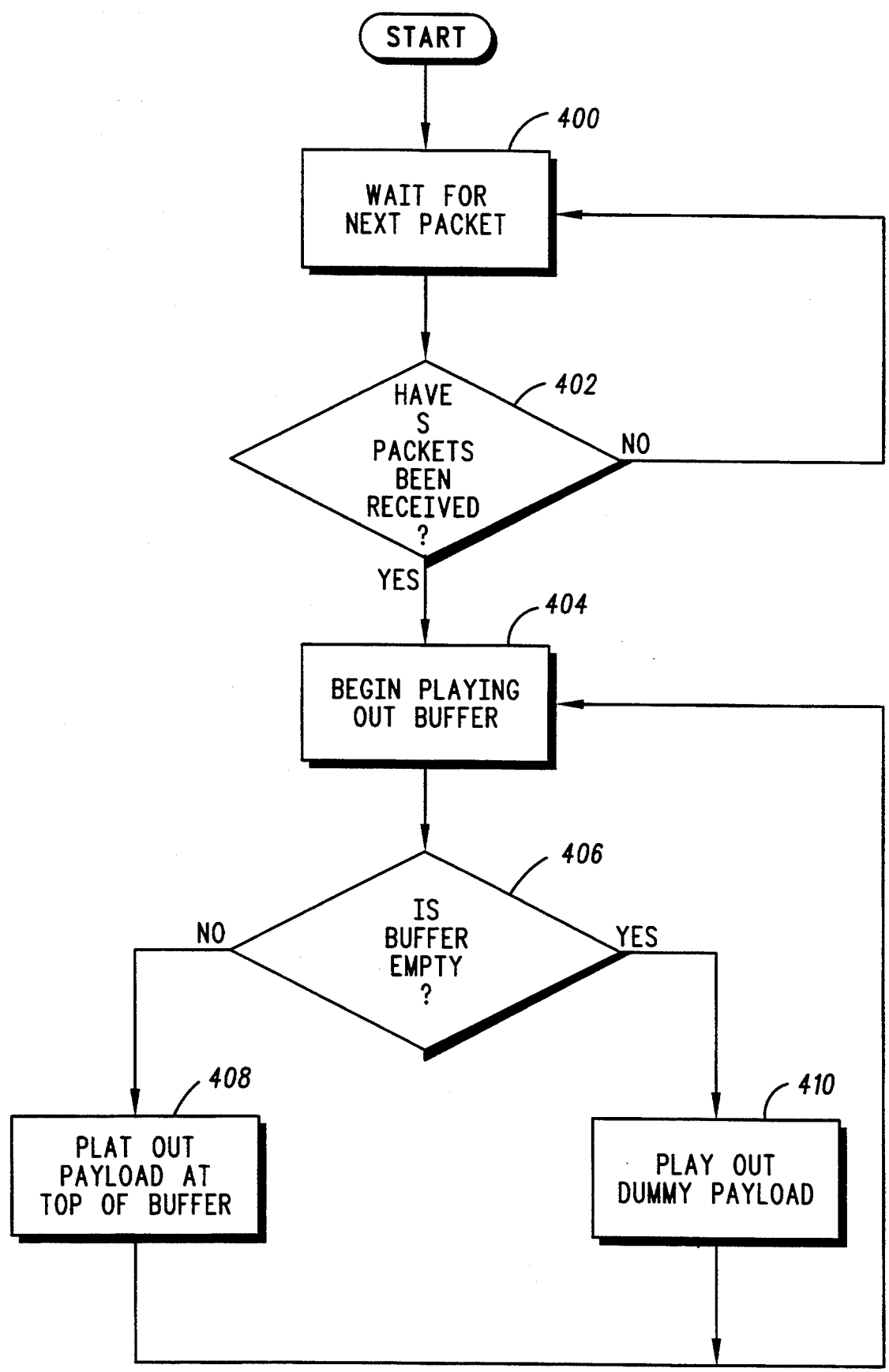
FIG. 6 is a chart of the dequeuing process for CBR fast packets at the CBR traffic destination node.

As the packets are enqueued, the packets are dequeued, i.e., played out to CBR destination 20, in accordance with FIG. 6. The CBR packet is received (step 400). CBR packet playout begins whenever a selected number of packets (referred to as 'S') has been received by destination edge node 18 (step 402).

After playout starts (step 404), the status of the buffer is checked to determine if it is empty (step 406). If the buffer is empty, then a dummy payload is played out (step 410). Otherwise, the payload at the top of the buffer is played out (step 408).

An illustration of network behavior is shown in FIG. 4. In the example, S, K and L have been set to 2. (Note that different values for S, K and L could have been chosen.) FIG. 4.1 shows the CBR data as received by source edge node 14 from CBR source 12. The packetized CBR data is shown in FIG. 4.2. The CBR packets are received at destination edge node as shown in FIG. 4.3.

FIG. 4.4 shows the playout of the CBR data, while FIG. 4.5 shows the status of the CBR buffer.

The first CBR packet is received, and placed in the buffer. Since less than two (S) packets have been received, playout has not commenced. After packet 2 is received, the contents of the buffer increases to two packets and playout commences. After the playout of packet 1, the contents of the buffer returns to one. Packet 3 is received during the playout of packet 2, thus increasing the contents of the buffer to two packets once again. CBR packet 4 does not arrive at the destination until after the completion of CBR packet 3 playout. Thus, the buffer is empty when playout of CBR packet 3 ends.

A dummy packet (shown by XX) is played out. While the dummy packet is played out, CBR packet 4 arrives. Shortly thereafter, CBR packet 5 and CBR packet 6 arrive before playout of CBR packet 4 completes. Because the number of packets in the buffer is greater than two (L) CBR packet 6 is dropped.

CBR packet 7 is received after playout of packet five, and thus is enqueued in the buffer, and is played out after the playout of CBR packet 5.

The inclusion of the dummy packets during the enqueuing of the packets in the CBR buffer and during the playout of the CBR packets serves to both compensate for packets lost in the network and for changes in the fixed and variable components of the fast packet delays through the network. The system, in effect, adapts the playout delay upwards to changing conditions within the network. Conversely, dropping a fast packet when L packets are already in the buffer, adapts the playout delay downwards to changing conditions within the network.

Selection of variables S, K and L is based upon the rate data is generated and the expected maximum variability in packet delay. An example is best used to demonstrate selection of S, K and L. Consider a situation where CBR source 12 generates data at a constant rate of 64 kb/s (kilobits/second). With payload 64 containing 44 data bytes, a fast packet is generated at the source edge node 14 every 5.5 ms (milliseconds). Further, consider a path through network 10 from source edge node 14 to destination edge node 10 with a maximum variability in packet delay of 10 ms due to queuing of fast packets at the source edge node 14 and intermediate edge node 16. Because the maximum variability in the packet delay is less than twice the packetization delay, the variability in fast packet delay can be smoothed by setting S=2 in the dequeue process of FIG. 6. Similarly, K may be set to 3 and L may be set to 4 in the enqueue process of FIG. 5. In all cases, the parameters values are set so that S is less than or equal to K, and K is less than or equal to L.

We claim:

1. An adaptive playout method for constant bit rate traffic in fast packet networks, the network consisting of a plurality of interrelated nodes, comprising the steps of:
    converting the constant bit rate traffic into fast packets;
    transmitting fast the packets through the network;
    receiving the fast packets at one of the interrelated nodes;
    enqueuing the fast packets in a buffer;
    enqueuing dummy fast packets in the buffer to compensate for fast packets lost in the network; and
    playing out the contents of the buffer.

2. The method of claim 1 further comprising the step of playing out dummy fast packets to compensate for delay in receiving fast packets.

3. The method of claim 2 where enqueuing the fast packets in a buffer comprises the steps of:
    determining if the number of fast packets received at the buffer is greater than a predetermined number;
    dropping the fast packets if the number of packets is greater than that predetermined number;
    enqueuing the fast packets in the buffer if the number of fast packets is less than the predetermined number.

4. The method of claim 2 where playing out the contents of the buffer comprises the steps of:
    receiving a predetermined number of fast packets;
    playing out fast packets whenever more than that predetermined number of fast packets have been received;
    playing out a dummy fast packet whenever the buffer is empty.

5. In a communication network which includes a plurality of interconnected nodes, where one of the interconnected nodes is a CBR traffic source node and another node is a CBR traffic destination node, a system for transmitting CBR data from the CBR traffic source node to the CBR traffic destination node, comprising:
    packetizing means for converting the CBR data into discrete CBR fast packets;
    transmission means for transmitting the CBR fast packets between the interconnected nodes;
    a buffer at the CBR traffic destination node for storing the CBR fast packets when received;
    sequence means for determining if the CBR fast packets were received in sequence;
    storage means for inserting dummy packets into the buffer if the CBR fast packets were not in sequence; and
    playout means adaptable to changes in network delays for playing out the packet to the CBR destination node.

6. The system of claim 5 where the sequence means consists of impressing means at the CBR traffic source node for impressing on the CBR fast packets a sequence number and interrogation means at the CBR traffic destination node for determining if the CBR fast packets were received in sequence.

7. The communication network of claim 6 further comprising a processor for determining if the number of CBR fast packets in the buffer is greater than a first predetermined number, and if so, discarding CBR fast packets from the buffer.

8. The communication network of claim 7 where the processor also determines if packets are missing, and if so, then inserts dummy packets.

9. A method of transmitting in a network constant bit rate information, comprising the steps of:
    receiving the data;
    forming data packets from the data;
    transmitting the data packets in the network;
    receiving one of the data packets at a destination node;
    providing a data buffer for the received packet
    determining if the data buffer is full
    dropping the received packet if the data buffer is full
    if the data buffer is not full, determining if the received packet is in sequence;
    if the received packet is not in sequence, inserting at least one dummy packet into the data buffer;
    playing out the packets in the data buffer to the CBR destination after more than a first select number of packets have been received;
    if the data buffer becomes empty during play out before all of the CBR data has been received by the CBR destination, playing out a dummy packet;
    determining if the data buffer is full;
    dropping the packets if the number of packets is greater than a second select number; and
    enqueuing the packets in the data buffer if the number of packets in the buffer is less than the second select number.

* * * * *